(12) United States Patent
Erhardt et al.

(10) Patent No.: US 7,147,675 B2
(45) Date of Patent: Dec. 12, 2006

(54) METHOD AND DEVICE FOR FILLING VOLATILE LIQUIDS INTO THE HOUSING OF ELECTRIC COMPONENTS AND FOR SEALING THE HOUSING

(75) Inventors: Werner Erhardt, Ballendorf (DE); Andree Schwake, Heidenheim (DE)

(73) Assignee: Epcos AG, Munich (DE)

( * ) Notice: Subject to any disclaimer, the term of this patent is extended or adjusted under 35 U.S.C. 154(b) by 228 days.

(21) Appl. No.: 10/386,172

(22) Filed: Mar. 10, 2003

(65) Prior Publication Data

US 2004/0103526 A1 Jun. 3, 2004

Related U.S. Application Data

(60) Provisional application No. 60/383,104, filed on May 28, 2002.

(30) Foreign Application Priority Data

Mar. 8, 2002 (DE) ................ 102 10 110
Aug. 26, 2002 (DE) ................ 102 39 046

(51) Int. Cl.
*H01M 6/00* (2006.01)
(52) U.S. Cl. .................... 29/623.1; 29/623.3
(58) Field of Classification Search ............ 29/623.1, 29/623.3
See application file for complete search history.

(56) References Cited

U.S. PATENT DOCUMENTS

| | | | |
|---|---|---|---|
| 3,443,352 A | 5/1969 | Mencacci | |
| 3,479,793 A | 11/1969 | Evers | |
| 4,086,741 A | 5/1978 | Williams | |
| 4,905,454 A | 3/1990 | Sanfilippo | |
| 5,024,675 A * | 6/1991 | Stackpool et al. | 29/623.1 |
| 5,212,867 A * | 5/1993 | Vogel | 29/623.1 |

FOREIGN PATENT DOCUMENTS

| | | |
|---|---|---|
| DE | 195 18 152 A1 | 11/1995 |
| DE | 199 11 800 C1 | 11/2000 |
| GB | 2 289 461 A | 11/1995 |

\* cited by examiner

*Primary Examiner*—Dah-Wei Yuan
(74) *Attorney, Agent, or Firm*—Laurence A. Greenberg; Werner H. Stemer; Ralph E. Locher

(57) ABSTRACT

The invention describes a method and a device for introducing volatile liquids into housings of electrical components, in particular of passive electrical components or of electrochemical cells, and for closing the housings. The method can be carried out using an evacuable chamber (1), a conveyor device (2) for conveying the components (4), a gas pressure device (9, 12, 13, 14) for generating a gas pressure atmosphere in the chamber, a filling device (5, 8, 11, 15) for introducing a volatile liquid into a component (4), a closing device (6, 17) for closing the component (4), and using a programmable sequence control means (10), which controls the conveyor device (2), the gas pressure device (9, 12, 13, 14), the filling device (5, 8, 11, 15) and/or the closing device (6) in such a way that these devices interact in a predetermined manner.

15 Claims, 2 Drawing Sheets

METHOD AND DEVICE FOR FILLING VOLATILE LIQUIDS INTO THE HOUSING OF ELECTRIC COMPONENTS AND FOR SEALING THE HOUSING

CROSS-REFERENCE TO RELATED APPLICATION

This application claims the benefit under 35 U.S.C. § 119(e) of copending provisional application No. 60/383,104, filed May 28, 2002.

BACKGROUND OF THE INVENTION

Field of the Invention

The invention relates to a method for introducing volatile liquids into housings of electrical components, in particular of passive electrical components or of electrochemical cells, and for closing the housings.

The invention also relates to a device for introducing volatile liquids into housings of electrical components, in particular of passive electrical components or of electrochemical cells, and for closing the housings.

Components of this type, if they are passive electrical components, are electrical double-layer capacitors, hybrid capacitors, pseudo-capacitors or further components which have to be filled and in particular impregnated with an electrolyte as liquid. In this context, the term impregnation is to be understood as meaning the immersion of certain elements of the component which are arranged in the housing and which, as it were, have to suck up liquid until they are full. Electrochemical cells include, inter alia, lithium ion cells or batteries of this type or lithium-thionyl chloride cells and lithium-sulfur dioxide cells, which likewise have to be filled or impregnated with an electrolyte.

The liquids used as electrolyte are generally volatile and harmful to health and are also highly flammable, and consequently have to be processed under particular precautions. Furthermore, the liquids must be as pure as possible, so that the impregnation of the components lead to good long-term electrical properties. A particularly harmful impurity is water, since this is broken down electrochemically at below the normal cell voltage, which would irreversibly damage the cells.

A double layer capacitor is used in the following text to explain a representative electrical component. However, it will be readily understood that the invention can also readily be applied to other components or housings of components.

Contact can be made with each electrochemical double-layer capacitor individually at the filling opening using a filling connection piece. The component housing is first of all evacuated via this filling connection piece to below the vapor pressure of the highly volatile organic electrolyte, so that the highly volatile liquid, such as for example a highly volatile organic electrolyte, can then be allowed to flow into the evacuated electrochemical double-layer capacitor. This leads to large-scale evaporation of the highly volatile solvent in the liquid and consequently to the feed line becoming blocked by the conductive salt which remains after evaporation of the highly volatile electrolyte after just a small number of cells. Furthermore, when the filling connection piece is removed from the filling opening, crystals of the conductive salt form as a result of evaporation of the highly volatile electrolyte. These salts crystals cause leaks after the filling opening has been closed up, for example with a rivet, having an adverse affect on the output.

If the impregnation is not carried out with the aid of evacuation of the housing of the component, but rather by the electrolyte being forced into the electrochemical double-layer capacitor with the aid of excess pressure, the displacement of the internal gas volume by the electrolyte which is forced in leads to very considerable numbers of gas bubbles being formed. This ultimately leads to considerable quantities of the electrolyte escaping again from the electrochemical double-layer capacitor through the filling opening. The evaporation of the highly volatile organic electrolyte and the formation of crystals of the conductive salt at the filling connection piece mean that it is impossible to close up the filling connection piece, for example using a rivet.

A further possible option for introducing a volatile liquid into one of the abovementioned components can be effected by dip-impregnation. In this case, by way of example, the entire electrochemical double-layer capacitor is submerged in the highly volatile liquid, such as the organic electrolyte. In this case too, crystals of the conductive salt remain at the filling opening, so that with this process too leaks occur when the component is being closed up. Furthermore, it is impossible to control the impregnated quantity of the highly volatile liquid with impregnation of this nature, since all the components suck up different amounts of liquid. Moreover, dip-impregnation leads to wetting of the housing outer surfaces, which makes further cleaning indispensable. Finally, this form of impregnation leads to a high level of consumption of the highly volatile liquid.

None of the abovementioned options for introducing the highly volatile liquid into the housing and for closing up the latter is suitable for production of relatively large numbers of units, since the process conditions change over the course of time. The abovementioned procedures are laborious and, in particular, expensive.

The invention is based on the object of providing a method and device of the type described in the introduction which allow economic production of a large number of the above-mentioned components.

The invention achieves this object by means of a method having the features of patent claim 1. The object is also achieved by a device having the features of patent claim 16.

Configurations of the invention are characterized in subclaims.

SUMMARY OF THE INVENTION

The invention has the advantage that the filling and closing of the components can be carried out quickly and inexpensively and in an automated fashion. It is easy to adjust to different shapes of housings or to different liquids.

As a further advantage, the invention improves the electrical and mechanical parameters of the finished components, since the process parameters can be kept within tight tolerance ranges.

Another advantage is that the consumption of volatile liquid can be optimized. Pressure stages with automated control during the filling of the housings make it possible to achieve rapid impregnation of the component. At the same time, the liquid is almost completely used for impregnation, without major losses.

The invention advantageously enables the number of components which are preferably arranged on a magazine and are positioned accurately to be matched to the number of filling steps and the size of the filling volume.

Furthermore, the invention enables the set of the plurality of components to be optimized in terms of number, size, throughput time. For example, in the case of a chamber with a plurality of magazines or in the case of a multichamber system, one magazine with components can be filled while, at the same time, a second magazine with components which have already been filled is being closed.

Finally, the invention can be used for a very wide range of shapes of housings of the components; both round and prism-shaped housings as well as housings in which the external electrical connections are arranged radially or axially, are suitable.

Furthermore, the invention can be used to introduce highly volatile liquid into any desired housings, i.e. including to introduce it into housings of components other than electrical components.

The impregnation of the component can take place without direct contact between the liquid delivery device and the filling opening in the housing. This avoids possible damage to the filling opening, which could lead to leaks when the housings are being closed up. This improves the yield.

The highly volatile liquid or the highly volatile organic electrolyte is brought to a defined pressure in a storage vessel prior to impregnation by means of the device according to the invention, so that evaporation of the highly volatile electrolyte is minimized. In this way, the formation of gas bubbles during the impregnation or filling operation is avoided.

The highly volatile liquid or the organic electrolyte is preferably introduced into the housing at a pressure which is higher than the vapor pressure of the highly volatile organic solvent by means of the programmable sequence control of the device. This means that the feed lines do not become blocked.

DESCRIPTION OF THE PREFERRED EMBODIMENTS

Figure 1:
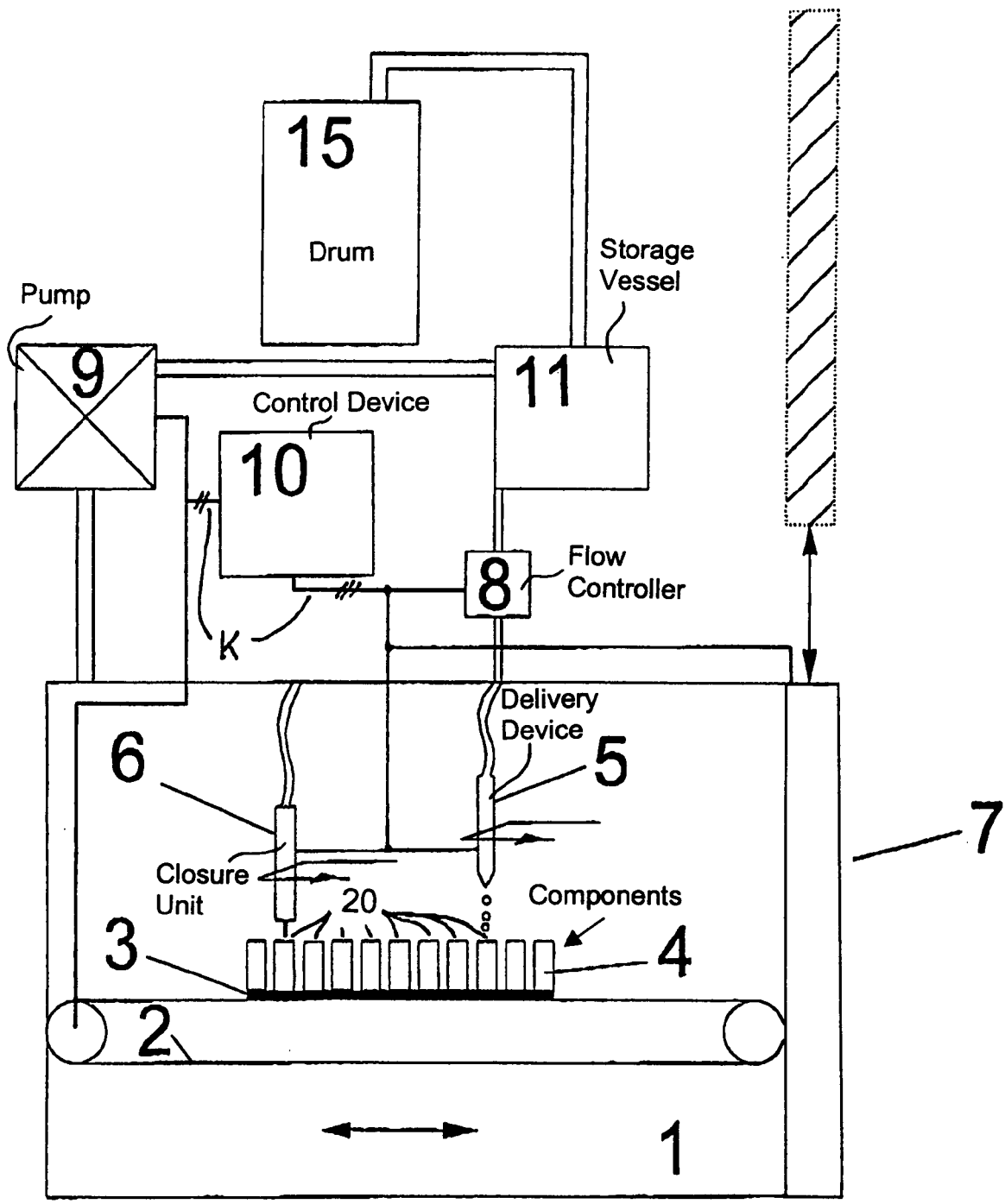
FIG. 1 is a diagram of a filling and closing device.

The filling and closing device as shown in the figures is controlled centrally by a sequence control means 10, for which manual operation of the overall installation can also be provided by means of a switch for test and setting purposes. The sequence control means 10 is preferably a programmable-memory means which includes one or more microprocessors with associated memory units. The sequence control means 10 uses a plurality of communication lines K to control the temperature, vacuum and filling-level means of the device as well as the corresponding valves and motors, e.g. of the conveyor devices 2 and of the doors 7. The sequence control means 10 is in communication with measurement and detection systems (not shown) for the process parameters of the installation or device, which comprise corresponding optical, mechanical or electrical sensors, likewise via correspondingly assigned communication lines K.

The components 4 which are to be filled, e.g. the electrochemical double-layer capacitors which are to be impregnated, are positioned on magazines 3 and first of all are dried in a chamber 16. The components are dried in a drying oven of this type in order to condition them before the liquid is introduced.

Figure 2:
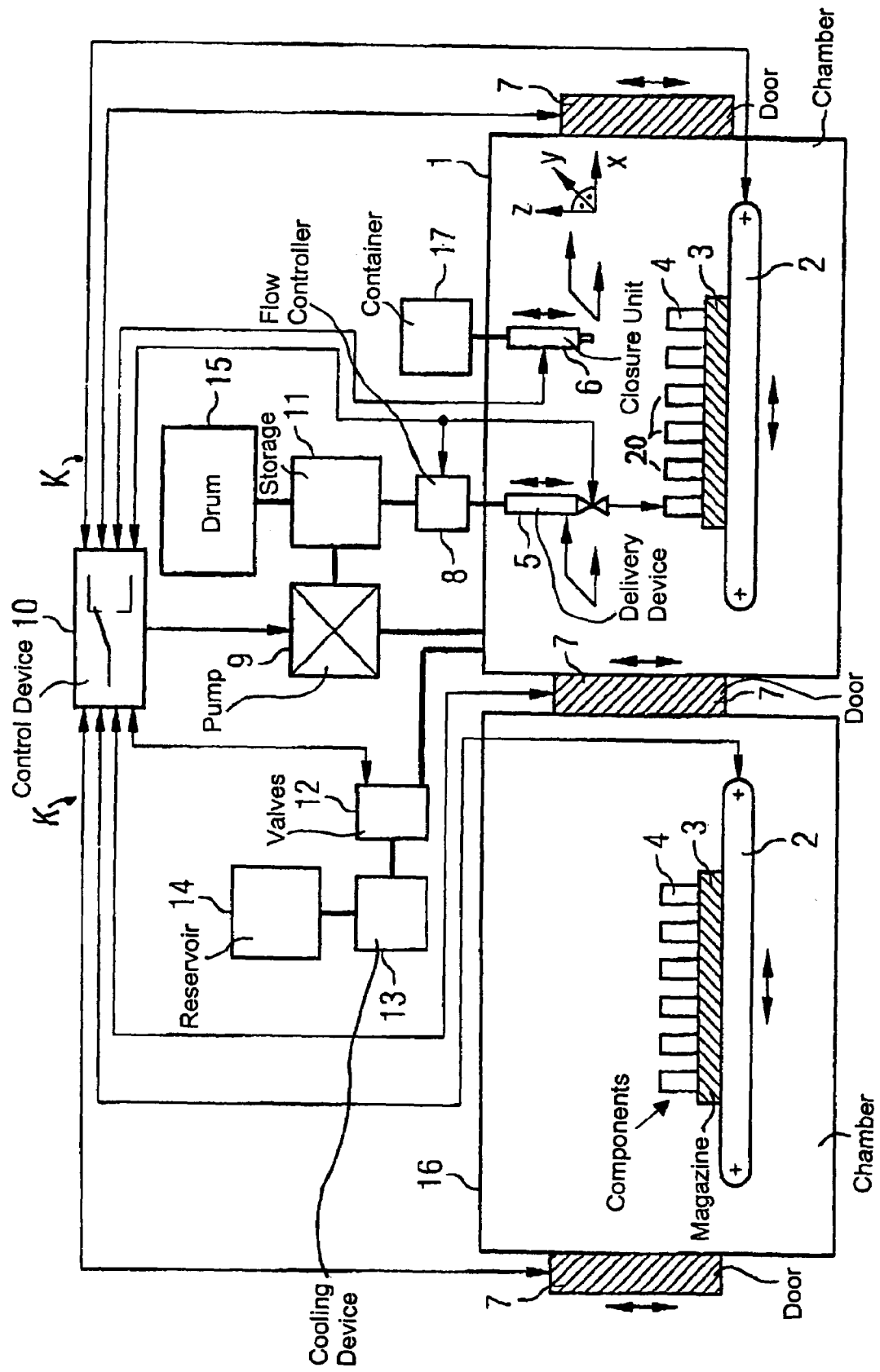
FIG. 2 is a detailed diagram of the filling and closing device.

One or, depending on the size of the installation, more magazines 3 can be conveyed into the chamber 1 on a conveyor belt 2 passing through a closeable door 7. The magazine 3 can be positioned in the chamber 1 with the aid of the conveyor belt 2. The positioning may take place, for example, linearly in the x direction or in two dimensions with a further direction in the x/y direction with the y direction being transverse with respect to the conveying direction of the conveyor belt (as per the system of coordinates shown in FIG. 2).

The components may be positioned in n*m matrix form where n,m=1, 2, 3, . . . , i.e. including as a single row, on each magazine. They are at defined spacings from one another, so that their position is unambiguously defined. If appropriate, it may be sufficient to measure the position of one component in order to determine the positions of the other components. Of course, it is also possible to measure the position of one column of the matrix or one row of the matrix or of each component and to communicate this information to the sequence control means 10. A subatmospheric pressure, which can be selected as desired and is preferably above the vapor pressure of the liquid to be introduced, can be generated in the chamber 1 with the aid of a vacuum pump 9.

In the chamber 1 there is one or more delivery devices 5 for the liquid. The delivery devices include, for example, valves. The delivery devices 5 have to be able to move relative to the housings which are to be filled. Therefore, if, for example, the magazine 3 has been placed in a fixed position in the chamber 1 or can only be moved linearly, a delivery device 5 can move freely in the x and/or y direction and can be positioned above the filling opening(s) of the components 4 with the aid of the sequence control means 10 and one or more detection systems (not shown separately). If the delivery device is in a fixed position, it must be possible for the magazine to be positioned as desired; in this case, however, a larger chamber is required.

The highly volatile organic electrolyte can be metered out of a storage vessel 11 by the delivery device 5, for example with the aid of a mass flow controller 8. There is no need for any direct contact between the delivery nozzle of the delivery device and the opening of the component during the filling operation.

Each component may have one or more filling openings 20. In extreme circumstances, this may be the entire cross section of the component, if it does not yet have a cover, in which case the cover must subsequently be welded or flanged or folded on. Otherwise, the filling openings 20 are preferably riveted, pinched or welded shut.

The highly volatile organic electrolyte in the storage vessel 11 can be degased with the aid of the vacuum pump 9 at a subatmospheric pressure which is higher than the vapor pressure of the highly volatile organic electrolyte. The storage vessel 11 is fed with undegased, highly volatile organic electrolyte from a drum 15.

A subatmospheric pressure is generated in the chamber 1 with the aid of a gas pressure device. The gas pressure device comprises a vacuum pump 9 and a means 12, 13, 14 for generating an atmosphere, e.g. with an inert gas, which is not shown in FIG. 1. The means comprises, in a manner which known per se, valves 12, if appropriate a cooling means 13 and a gas reservoir 14 for supplying the chamber 1 with the gas atmosphere.

The subatmospheric pressure which is generated by means of the vacuum pump 9 correlates with the pressure of the storage vessel 11 and is above the vapor pressure of the highly volatile organic electrolyte. Then, the delivery device 5 is positioned above the filling opening in a component 4 with the aid of the detection system. If there are a plurality of delivery systems, this step may be carried out in parallel for a plurality of components. Then, a quantity of the highly volatile electrolyte which is controlled by means of the mass flow controller 8 is metered through the filling opening into the component(s) by means of the mass flow controller 8. The quantity is set in such a way that the free space which is present in the component is filled in a defined way with the highly volatile organic electrolyte.

Then, the delivery device 5 is positioned above the filling opening of the next component 4. These method steps are repeated until all the components 4 located on the magazine 3 have been filled once. Then, a higher pressure, e.g. atmospheric pressure, is established in the chamber 1 with the aid of a gasification valve 12 and/or the vacuum pump 9. As a result, the highly volatile organic electrolyte is forced into the components 4, e.g. the electrode windings of electrochemical double-layer capacitors.

If necessary, all the steps which have been described thus far can be repeated, with suitable adjustments to the process parameters, e.g. different pressures, until the required quantity of the highly volatile electrolyte has been impregnated into each of the components 4.

Furthermore, the device includes one or more closing devices 6, 17, of which one or more automated closure units 6, e.g. automated riveting units, are located in the chamber 1. These are likewise moveable with respect to the housings and can move freely, for example, in the x and/or y directions. An automated closure unit is equipped with one or more detection units (not shown in the drawing) which are in communication with the sequence control means 10 and with the aid of which it is possible, following the impregnation, to accurately close up the filling openings of the components, for example using a rivet. The closing device is supplied with closure means, e.g. rivets, by means of a storage container 17, which is only shown in FIG. 2. This may be a blind cup rivet in which the rivet cup is placed with the rivet shank onto the opening which is to be closed. After the rivet shank has been drawn through, the opening is closed up by the burr formed.

During the method step of closing the housings, the filling openings in the impregnated components are closed up using the automated closure unit 6, for example by a rivet, at a freely programmable pressure which is higher than the vapor pressure of the highly volatile liquid.

If the chamber is of a suitable size or if there are two chambers, it is also possible for a plurality of magazines to be processed simultaneously and in parallel, i.e. to be filled and closed simultaneously.

Then, the contaminated atmosphere can be exchanged for a fresh atmosphere in a manner which is known per se, the door 7 can be opened and the magazine(s) 3 together with the closed components 4 can be removed from the chamber 1, for example via the conveyor belt 2. If there are two doors 7, it is possible, as illustrated, for the magazine to be conveyed out of the chamber on the opposite side from the introduction side, for example into a third chamber (not shown) or into a further drying oven.

The filling and closing of the components take place in the chamber, preferably using a gas pressure device comprising vacuum pump, gasification valve and storage reservoir under an inert gas atmosphere. The inert gas used is an element from the eighth main group of the periodic system, in particular argon, nitrogen, carbon dioxide or helium.

The inert gas which has been provided from a storage vessel 14 is preferably cooled by means of a cooling means 13, e.g. a heat exchanger. The water content and the oxygen content of the inert-gas atmosphere should be below 100 ppm.

The liquid to be introduced is preferably cooled to a temperature which is above its crystalization point. This reduces the filling volume and the vapor pressure. However, lower pressures mean smaller amounts of gas forming during the impregnation.

The liquid used may, inter alia, include liquids which can be gelled or polymerized after they have been introduced. Furthermore, it is possible to introduce nitrites, such as acetonitrile, a glycol, a lactone, a sulphone, a carboxylic acid ester, a ketone, an aldehyde or a carbonate or mixtures thereof, in which one or more conductive salts are dissolved. Finally, the liquid introduced may be salts which are molten at room temperature. It is also possible to use salt mixtures or mixtures of salts with the abovementioned liquids, if appropriate using solvents.

The electrical components which are filled and closed may be lithium ion cells, lithium-thionyle chloride cells or lithium-sulfur dioxide cells, electrochemical double-layer capacitors, aluminum electrolyte capacitors, hybrid capacitors or pseudo-capacitors.

Before they are introduced into the chamber, the components can be dried as described and then cooled.

It will be understood that the device according to the invention can also use methods other than that described for introducing liquids into and closing up component housings. In these cases, the sequence control means is accordingly to be programmed differently.

We claim:

1. A device for introducing volatile organic liquids into housings of electrical components and for closing the housings, the device comprising:
    an evacuatable chamber;
    a conveyor device for conveying the components;
    a gas pressure device for generating a gas pressure atmosphere in the chamber, the gas pressure atmosphere being an inert-gas atmosphere with a variable pressure being at least higher than a vapor pressure of a volatile organic liquid;
    a filling device for introducing the volatile organic liquid into the components;
    said gas pressure device being programmed to increase the gas pressure atmosphere after the volatile organic liquid has been introduced into the components;
    a closing device for closing the components; and
    a programmable sequence control device for controlling an interaction, in a predetermined sequence, between at least two components selected from a group consisting of said conveyor device, said gas pressure device, said filling device and said closing device.

2. The device according to claim 1, wherein said programmable sequence control device includes a programmable-memory controller with a microprocessor.

3. The device according to claim 1, wherein said gas pressure device includes a vacuum pump, a gas reservoir and a gasification valve.

4. The device according to claim 3, wherein said gas pressure device is for compressing an inert gas.

5. The device according to claim 4, wherein said gas pressure device includes a cooling device for cooling the inert gas that has been compressed.

6. The device according to claim 1, wherein said filling device includes a delivery device for introducing the volatile organic liquid into the housings of the components.

7. The device according to claim 6, wherein said delivery device is configured for movement in predetermined directions.

8. The device according to claim 7, wherein said filling device includes a storage vessel and a mass-flow controller.

9. The device according to claim 8, wherein said gas pressure device includes a vacuum pump for setting said storage vessel to a predetermined pressure.

10. The device according to claim 1, wherein said closing device includes an automated closure unit and a storage container.

11. The device according to claim 10, wherein said automated closure unit is configured for movement in predetermined directions.

12. The device according to claim 1, further comprising a further chamber and a door connecting said chamber and said further chamber.

13. The device according to claim 12, wherein said further chamber is a process chamber or a drying oven.

14. The device according to claim 1, further comprising:
a further chamber and a door connecting said chamber and said further chamber;
said closing device including an automated closure unit configured in said further chamber;
said filling device includes a delivery device configured in said chamber.

15. The device according to claim 1, in combination with the components, wherein the components are passive electrical components or electrochemical cells.

* * * * *